3,169,977
NOVEL PREPARATION OF 19-FORMYL-STEROIDS
Johannes Kloosterman, Oss, Netherlands, assignor to
  Organon Inc., West Orange, N.J., a corporation of New
  Jersey
No Drawing. Filed Aug. 12, 1963, Ser. No. 301,650
Claims priority, application Netherlands, Sept. 19, 1962,
  283,417
3 Claims. (Cl. 260—397.3)

The invention relates to a process for the preparation of 10-formyl-steroids by oxidation of 19-hydroxy-steroids with chromic acid.

The method generally applied until recent years for the preparation of 19-nor-steroids consisted in that $\Delta^{1,4}$-3-keto-10-methyl-steroids were submitted to an aromatization by heating in for instance tetralin, converting the thus prepared $\Delta^{1,3,5(10)}$-3-hydroxy-steroids after that into $\Delta^4$-3-keto-19-nor-steroids by reduction in accordance with the Birch method.

A less expensive method which has been gaining ground in recent years to an ever increasing extent, consists in that a 6$\beta$-hydroxy-10-methyl-steroid is treated with a metal acylate and the resulting 6,19-oxido compound reacted with zinc, followed by conversion of the resulting 19-hydroxy compound into the corresponding 19-norsteroid by treatment with a base, such as sodium hydroxide.

Higher yields are obtained when the 19-hydroxy-steroid compound is first oxidized into the corresponding 10-formyl compound, followed by splitting off of the formyl group under the influence of a strong base.

The oxidation of a hydroxy-steroid is usually performed with a complex of chromium trioxide and an organic base, such as dimethylformamide.

Another well-known and frequently applied oxidation method consists in that the relative hydroxy-steroid is reacted with chromium trioxide in the presence of a ketone, such as acetone, or another organic solvent, such as glacial acetic acid.

In the literature last-mentioned method for the oxidation of a 19-hydroxy-steroid is especially mentioned. See, for instance, Chem. Abstracts 54, p. 22724 (1960), describing the oxidation of the $\Delta^4$-3,17-diketo-19-hydroxy-androstene into the corresponding 10-formyl compound by means of chromic acid in the presence of glacial acetic acid. The said oxidation yields about 60%.

It has been found now that the yield of the oxidation of a 19-hydroxy-steroid with chromic acid can be raised considerably when the relative oxidation is performed in the presence of a halogenated aliphatic hydrocarbon.

As examples of halogenated aliphatic hydrocarbons to be used in the present reaction are mentioned: chloroform, bromoform, carbon tetrachloride, dichlorobutane, dichloroethane, trichloroethane and bromobutane. Generally a halogenated saturated aliphatic hydrocarbon with 1–6 carbon atoms is used, especially methylene chloride and chloroform.

The oxidation according to the invention is usually carried out as follows: The relative 19-hydroxy-steroid is dissolved in the halogenated aliphatic hydrocarbon to be used, for instance chloroform, whereupon chromiumtrioxide is added to this solution. For preference the chromiumtrioxide is used in a solution of sulphuric acid diluted with water, usually in a concentration of 2 to 10 N.

Usually an excess of chromiumtrioxide is used, preferably 1½–2 mol per mol of steroid.

The reaction temperature and reaction period are not tied to strict limits. The reaction is usually performed at a temperature below 60° C. in 2 to 20 hours.

The invention is illustrated further by the following examples:

*Example I*

To a solution of 10 g. of $\Delta^4$-3,17-diketo-19-hydroxy-androstene in 100 ml. of methylene chloride are added at 40° C. 12.2 ml. of an 8 N aqueous solution of chromic acid. The mixture is stirred for 3 hours and then cooled. The methylene chloride layer is separated, washed until neutral and evaporated to dryness. The residue is crystallised from ethanol to obtain the $\Delta^4$-3,17,19-triketo-androstene in 80% yield.

The conversion in glacial acetic acid or acetone described above yielded 60 to 65% only.

*Example II*

To a solution of 5 g. of 19-hydroxy-testosterone-17-benzoate in 120 ml. of chloroform are added at 35° C. 10 ml. of a solution of 8 N chromiumtrioxide. The mixture is stirred for 3 hours at the temperature mentioned, whereupon it is poured out into 500 ml. of a solution of 1% $Na_2SO_3$. The precipitate is filtered off, washed with water and dried to obtain the 19-oxo-testosterone-17-benzoate in 82% yield. By application of carbon tetrachloride and dichloroethane in the same manner, yields were obtained amounting to 81 and 82% respectively.

*Example III*

To a solution of 2 g. of $\Delta^4$-3,20,diketo-19-hydroxy-pregnene in 60 ml. of chloroform are added at 40° C. 6 ml. of an aqueous solution of 8 N chromic acid, after which the mixture is stirred for 4½ hours at 40° C. Next the mixture is further treated as described in Example I to obtain the $\Delta^4$-3,19,20-trioxo-pregnene, melting point 138–140°, in 78% yield.

In the same manner the $\Delta^5$-3,17,19-trihydroxy-androstene-3,17-diacetate have been converted in the presence of methylene chloride and carbon tetrachloride into the corresponding 19-oxo compounds in 80% yield.

I claim:
1. Method for the preparation of a 10-formyl-steroid selected from the group consisting of the androstane and pregnane series comprising oxidizing a 19-hydroxy-steroid selected from the group consisting of the androstane and pregnane series with chromium trioxide in the presence of a halogenated aliphatic hydrocarbon solvent.

2. The method of claim 1 in which the solvent is chloroform.

3. The method of claim 1 in which the solvent is methylene chloride.

References Cited by the Examiner

UNITED STATES PATENTS 3,077,482  2/63  Wettstein et al. _____ 260—397.1

OTHER REFERENCES

Narasinha et al.: Journ. Org. Chem. (1962), page 4694 relied on.

LEWIS GOTTS, *Primary Examiner.*